United States Patent [19]
Wright, Jr.

[11] 3,985,266
[45] Oct. 12, 1976

[54] APPARATUS FOR CONTROLLING THE FEED RATE AND BATCH SIZE OF A MATERIAL FEEDER

[75] Inventor: Thomas Jack Wright, Jr., Cherry Hill, N.J.

[73] Assignee: K-Tron Corporation, Glassboro, N.J.

[22] Filed: Aug. 13, 1975

[21] Appl. No.: 604,506

[52] U.S. Cl. ................................. 222/22; 222/55; 222/77; 177/16; 177/120; 198/504; 318/310; 222/76
[51] Int. Cl.² ........................................ B67D 5/30
[58] Field of Search .................. 222/14, 16, 21, 22, 222/52, 55, 59, 63, 71, 76, 77, 371, 415; 177/16, 120, 121; 198/37, 39; 318/310, 311, 461

[56] References Cited
UNITED STATES PATENTS

| | | | |
|---|---|---|---|
| 3,412,699 | 11/1968 | Culp et al. | 198/37 |
| 3,679,010 | 7/1972 | Bullivant | 177/16 |

*Primary Examiner*—Robert B. Reeves
*Assistant Examiner*—H. Grant Skaggs
*Attorney, Agent, or Firm*—Seidel, Gonda, & Goldhammer

[57] ABSTRACT

Apparatus for controlling the feed rate and batch size of the material feeder is disclosed. A signal generator computes the weight of material delivered by the material feeder and compares it to first and second presettable values. When the weight of material delivered by the feeder is less than the first presettable value, the signal generator enables a first pulse generator which generates a pulse train having a relatively high pulse repetition frequency. This pulse train is applied to a motor speed controller which causes the feeder to deliver material at a relatively high rate. When the weight of material delivered by the feeder reaches the first presettable value, the signal generator enables a second pulse generator and disenables the first pulse generator. The second pulse generator generates a pulse train having a pulse repetition frequency substantially lower than that of the pulse train generated by the first pulse generator. The second pulse train is also applied to the motor speed controller which then causes the feeder to deliver material at a relatively low rate. Finally, when the weight of material delivered by the feeder reaches the second presettable value, the signal generator generates an end of batch signal which disenables the motor speed controller and causes the material feeder to stop delivering material.

13 Claims, 6 Drawing Figures

APPARATUS FOR CONTROLLING THE FEED RATE AND BATCH SIZE OF A MATERIAL FEEDER

BACKGROUND OF THE INVENTION

The present invention relates to a control apparatus for controlling the feed rate and batch size of a material feeder. More particularly, the present invention relates to a control circuit for controlling the armature current to a DC drive motor thereby controlling the operation of the material feeder powered by the drive motor.

Control apparatus for controlling the feed rate and batch size of material feeders are well known in the art. Two such devices are disclosed in U.S. Pat. No. 3,724,720 and U.S. Pat. No. 3,763,943.

The present invention overcomes certain disadvantages of these and other prior art devices by utilizing digital electronic counting techniques for controlling both the feed rate and batch size of a material feeder. The utilization of such techniques in the manner shown herein, provides reliable, fast and efficient delivery of material with extremely high batch size and accuracy.

The apparatus of the present invention comprises a signal generators which continuously monitors the weight of material delivered by a material feeder. As long as the weight of material delivered by the feeder is below a first predetermined value, the signal generators enables a first pulse generator which generates a pulse train having a comparatively high pulse repetition frequency. The pulse train so generated is applied to the input of a motor speed controller which supplies a DC motor powering the material feeder with an armature current proportional to the pulse repetition frequency of the pulse train applied to its input. In the preferred embodiment a feedback loop is provided to assure a constant feed rate despite irregularities in the load on the feeder. When the weight of material delivered by the feeder reaches the first preset value, the first counter means generates a dribble speed signal which disables the first pulse generator and enables a second pulse generator. The second pulse generator generates a pulse train having a pulse repetition frequency substantially less than the pulse repetition frequency of the first pulse train. The second pulse train is applied to the motor speed controller which, due to the lower pulse repetition frequency of the second pulse train, will supply a lower level of armature current to the DC motor thereby causing the feed rate of the material feeder to decrease.

When the weight of material delivered by the feeder is detected to have reached a second preset value, the first counter means will generate an end of batch signal which disables the motor speed controller thereby removing the armature current from the DC motor and discontinuing the delivery of material by the material feeder.

For the purpose of illustrating the invention, there are shown in the drawings forms which are presently preferred; it being understood, however, that this invention is not limited to the precise arrangements and instrumentalities shown.

DETAILED DESCRIPTION OF THE PREFERRED EMBODIMENTS

Figure 1:
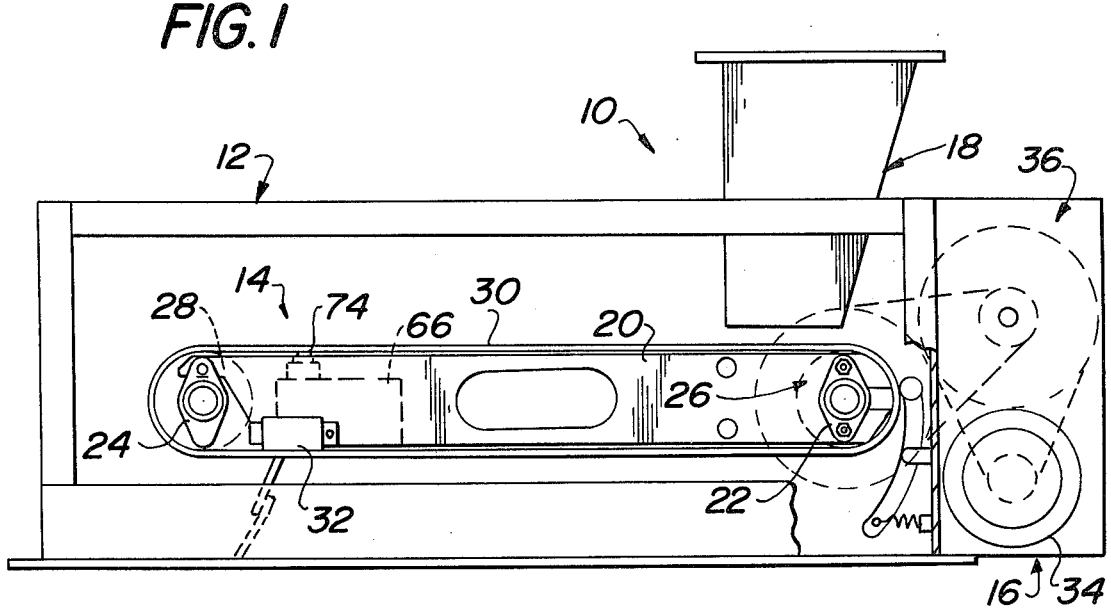
FIG. 1 is a schematic view in elevation of a feeder which may be controlled by the present invention.

Referring now to the drawings wherein like numerals indicate like elements, there is shown in FIG. 1 a typical material feeder 10 which may be utilized in connection with the herein disclosed control circuit. The main components of feeder 10 are structural frame member 12, conveyor belt system 14, drive means 16 and hopper feeder 18. The hopper 18 is fixedly positioned above conveyor belt system 14 on frame member 12. Conveyor belt system 14 comprises a pair of longitudinally extending support means 20, two pairs of laterally spaced bearings 22, 24, rotatably mounted drive pulley 26, rotatably mounted pulley 28 and endless belt 30. Endless belt 30 rides on pulleys 26 and 28 which are rotatably mounted on the pairs of laterally spaced bearings 22 and 24, respectively. Laterally spaced bearings 22 are fixedly mounted on one end of longitudinally extending support members 20 which, in turn, are mounted on frame member 12. Laterally spaced bearings 24 are pivotably mounted on the opposite ends of support member 20. Tension in endless belt 30 is provided by belt tension means 32 which is connected at one end to longitudinally extending support member 20 and at the other end to bearing 22 at a point remote from its pivotal connection to support member 20.

Drive means 16 comprises electric motor 34 and speed reducer means 36 by which the output of electric motor 23 is coupled to the drive pulley 26 of conveyor belt system 14. Preferably, electric motor 34 is a DC device with a permanent magnetic field. The speed of the motor is controlled by changing armature current. Increasing the armature current speeds up the motor; and decreasing the armature current slows down the motor.

In operation, dry granular material contained in hopper 18 is deposited on the top surface of endless belt 30 adjacent pulley 22 by means of a conventional valve (not shown). Rotation of electric motor 34 imparts movement to endless belt 30 which delivers the dry granular material to an outlet hopper (not shown) or other suitable receptacle.

Figure 3:
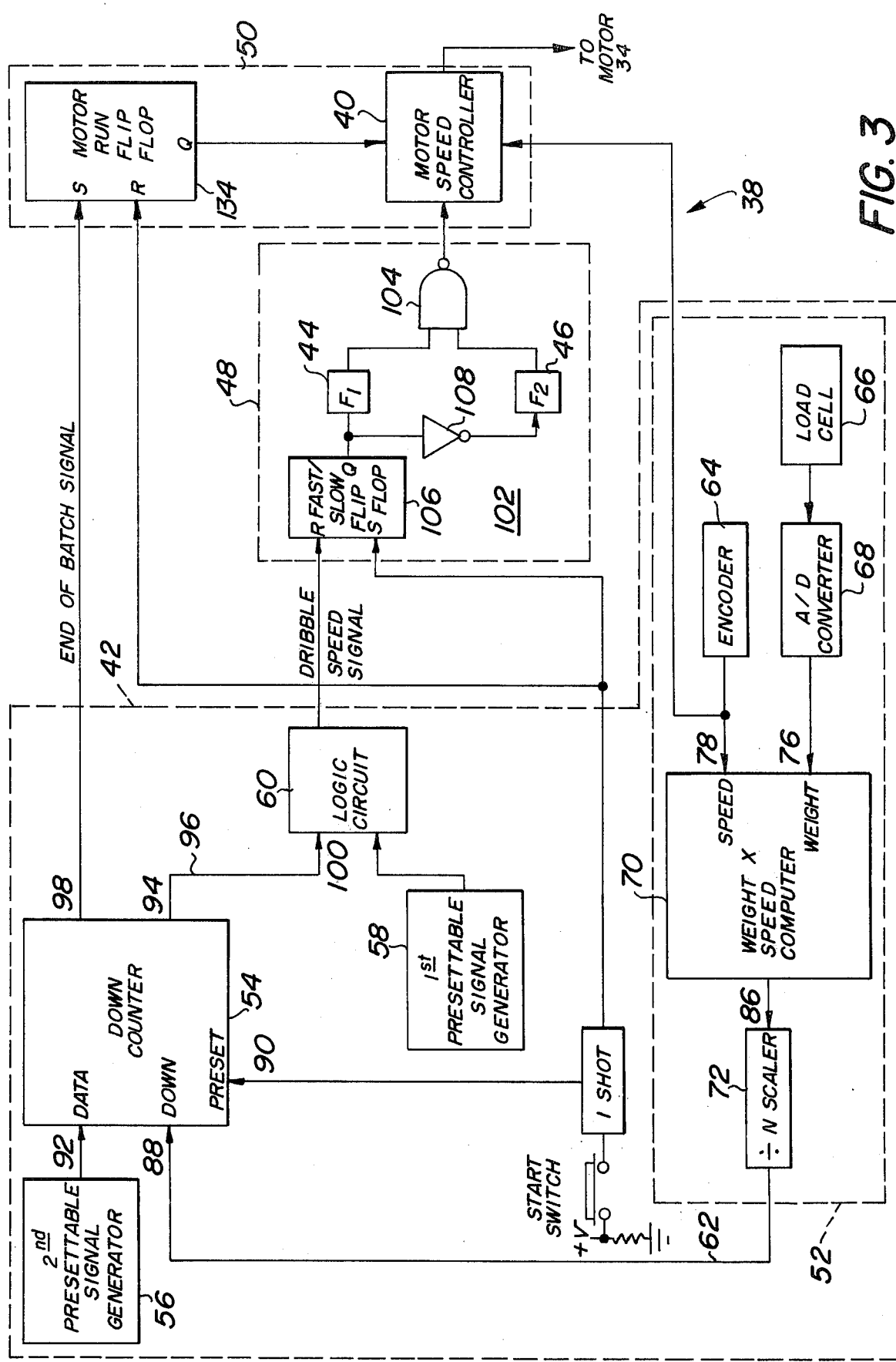
FIG. 3 is a block diagram of a control circuit constructed in accordance with the principles of the present invention.

Since the speed of belt 30 is proportional to the speed of motor 34, and the speed of motor 34 is proportional to its armature current, the delivery rate of feeder 10 may be controlled by controlling the armature current to motor 34. FIG. 3 illustrates a control circuit 38, constructed in accordance with the principles of the present invention, which generates a control signal at the output of motor speed controller 40 which supplies the armature current to motor 34.

Control circuit 38 comprises signal generator means 42 for computing the weight of material delivered by feeder 10 and for generating a dribble speed signal when the weight of material delivered by feeder 10 reaches a first preset value and an end of batch signal when the weight of material delivered by feeder 10 reaches a second preset value, means 44 for generating a first pulse train having a first repetition frequency, means 46 for generating a second pulse train having a second pulse repetition frequency, motor speed controller means 40, means 48 responsive to said dribble speed signal, and means 50 responsive to the generation of said end of batch signal.

Signal generator means 42 comprises means 52 for generating a mass flow signal, down counter 54, first and second presettable signal generators 58 and 56 respectively and logic circuit 60. In the preferred embodiment, means 52 for generating a mass flow signal detects the weight of material delivered by feeder 10 and generates a single digital pulse on line 62 for each predetermined weight of material delivered by feeder 10. Means 52 comprises an encoder 64, a load cell 66, an analog to digital converter 68, a weight $x$ times speed computer 70 and a divide by N scaler 72.

Load cell 66 generates an analog signal representative of the instantaneous weight of material on conveyor belt system 14. As best shown in FIG. 1, load cell 66 is positioned just below the upper portion of endless belt 30 and includes a detector arm 74 which is in operative contact with belt 30. Detector arm 74 is deflected an amount proportional to the instantaneous weight of material on belt 30. Load cell 66 is responsive to this deflection and produces an analog signal representative of the instantaneous mass of material on belt 30. Weight responsive devices such as load cell 66 are conventional and well known in the art. One such cell is described in U.S. Pat. No. 3,425,503. The output of load cell 66 is applied to input terminal 76 of weight $x$ speed computer 70 through analog to digital converter 68 which converts the analog output of load cell 66 into a digital form readable by weight $x$ speed computer 70.

Figure 2:
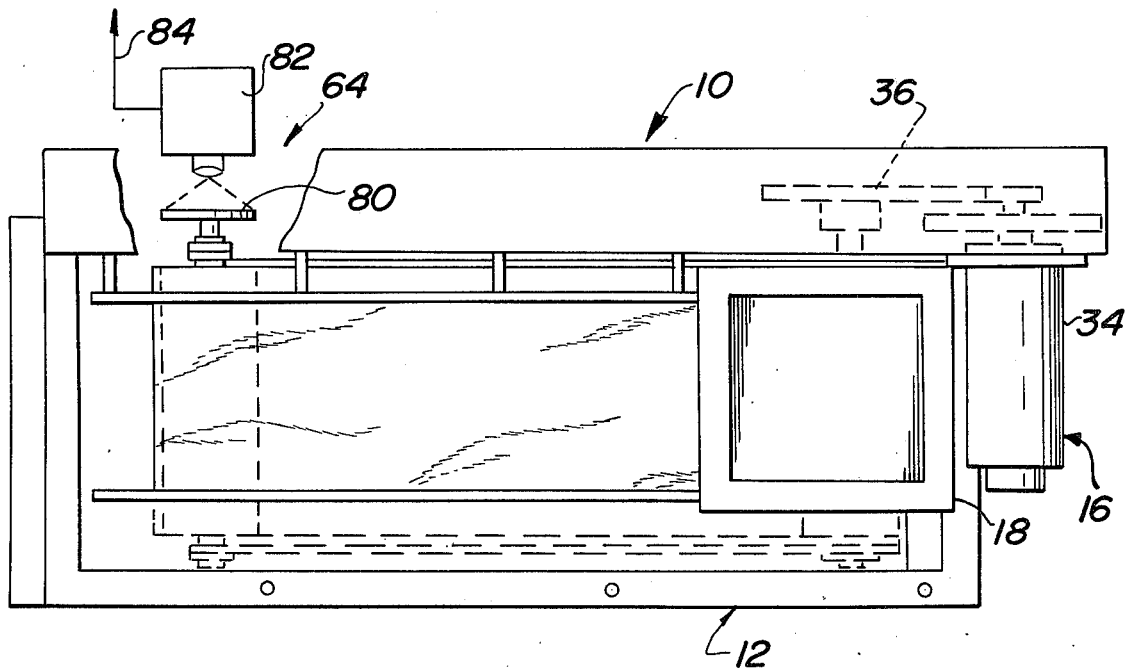
FIG. 2 is a schematic plan view of the feeder shown in FIG. 1 with portions with broken away for purposes of illustration.

Encoder 64 applies a digital signal representative of the instantaneous speed of belt 30 to input terminal 78 of weight $x$ speed computer 70. Encoder 64 is a conventional device for converting shaft rotation into a digital signal. As best seen in FIG. 2, encoder 64 includes a coded disk 80 attached to the shaft upon which pulley 28 is mounted. Transducer 82 of encoder 64 views disk 80 as it rotates in response to belt movement causing a pulse signal to appear at output lead 84. The frequency of pulses generated by transducer 82 will be directly proportional to the belt speed. While an optical encoder is disclosed, it will be obvious to those skilled in the art that other types of encoders could also be employed such as a proximity type magnetic pick up with a gear made of magnetic material.

Weight $x$ speed computer 70 is a conventional rate multiplier and performs a multiplicative operation on the instanteous speed signal applied to its input terminal 78 and the instantaneous weight signal applied to its input terminal 76 and develops a digital signal at its output terminal 86 which is representative of the actual mass flow rate of the material being delivered by feeder 10.

A rate multiplier is a conventional digital device that effectively multiplies an applied pulse train by a number. Essentially, a rate multiplier is a pulse train distributor which is effective to distribute various fractions of the input pulses into different lines each of which is ANDed with a different level signal derived from an associated cell of a storage register which holds the multiplier. The output of the rate multiplier is derived from all of the outputs of the AND gates. Only a gate whose associations cell furnishes an assertion level will pass the fraction of the input pulses by thereto, with the result that the total fraction of input pulses pass by the rate multiplier will depend upon which cells of the storage regiter provide assertion levels.

Consider, for example, a three cell binary rate multiplier to which a pulse train is applied. One-half of the input pulses (e.g., four of each group of eight input pulses) will be sent along a first output line; one-fourth of the input pulses (e.g., two out of each group of eight input pulses) will be sent along a second output line; and one-eighth of the input pulses (e.g., one out of each group of eight input pulses) will be sent along a third output line. Each of these output lines is ANDed with a level derived from a three cell storage register whose contents represents the multiplier. If there were an assertion level present only at the AND gate associated with the first output line of the pulse distributor, the multiplier would be one-half, and the output of the rate multiplier would be pulses coincident in time with the first, third, fifth and seventh pulses of each group of eight input pulses. If there were an assertion level present only at the AND gate associated with the second line of the pulse distributor, the multiplier would be one-fourth, and the output of the rate multiplier would be pulses coincident in time with the second and sixth pulse of each group of eight input pulses. If there were an assertion level present only at the AND gates of each of the first and second lines of the pulse distributor, the multiplier would be three-fouths, and the output of the rate multiplier would be pulses coincident in time with the first, second, third, fifth, sixth, and seventh pulse of each group of eight input pulses. An assertion level present at each AND gate corresponds to a multiplier of 7/8, and would permit the rate multiplier to pass pulses coincident in time with the first seven of each group of eight input pulses. By selectively varying the assertion levels, from one through seven pulses of each group of eight input pulses can be passed by the rate multiplier.

From the above description, it should be apparent that the number of cells of the rate multiplier determines the size of the group of input pulses that establishes the basis for distribution, and that the time period required for this group of pulses to be received by the multiplier determines a reference period of time. Within such period of time, from one through a number equal of one less than the total number of pulses in a group can be passed by the multiplier, depending on the contents of the storage register. As a consequence, the average frequency of the output pulses of a rate multiplier, namely the number of output pulses per reference period of time, depends on the contents of the storage register.

Rate multiplier are not limited to binary counters, and are available for binary-coded-decimal (BCD) counters, for example, In the BCD system of counting, a four cell counter is provided for each decimal place, and is arranged to count from 0 to 9 rather than to 15. Using this arrangement, a BCD rate multiplier could pass between one and nine pulses in each group of 10 input pulses, depending on the contents of a four cell storage register. If an eight cell counter were involved to provide two decimal places, from 1 through 99 pulses in each group of one hundred pulses could be passed by the multiplier.

In the preferred embodiment of the present invention, weight $x$ speed computer 70 is a commercially available synchronous decade rate multiplier such as an SN74167 manufactured by Texas Instruments, Inc.

This is a BCD rate multiplier which multiplies an applied pulse train by an applied BCD input. As shown in FIG. 3, a pulse train generated by encoder 64 is applied to speed input terminal 78 and a BCD signal generated by analog to digital counter 68 is applied to weight input terminal 76. While a BCD rate multiplier is preferred, the only requirement is that the analog to digital converter and rate multiplier used be compatible.

The output of weight x speed computer 64 is applied to divide by N scaler 72 which develops a single digital pulse at its output for every predetermined number of pulses applied to its input. By adjusting the number of pulses which must be applied to its input in order to produce a pulse at its output, it is possible to scale the mass flow output signal such that a single pulse will be generated for any predetermined weight of material delivered by feeder 10. In the preferred embodiment, divide by N scaler 72 is an adjustable repeatable counter which generates a single output pulse whenever a predetermined number of pulses is applied to its input.

The pulses generated by means 52 are applied to the down input terminal 88 of down counter 54. In the preferred embodiment, down counter 54 is a commercially available BCD binary up/down counter such as an MC14510 manufactured by Motorola Incorporated. When an enabling signal (a "high") is applied to preset input terminal 90, a preset count applied to data input terminal 92 and generated by first presettable signal generator 56 is transferred into down counter 54. Accordingly, when the preset input 90 is first enabled, the instanteous count in down counter 54 is equal to the preset signal determined by first presettable signal generator 56. Down counter 54 counts down from this value one count for each digital pulse generated by means 52. The instanteous count in down counter 54 appears at output terminal 94 of down counter 54. Accordingly, the signal appearing on line 96 is a difference signal representative of the difference between the preset count determined by second presettable signal generator 56 and the total number of pulses generated by divide means 52. As feeder 10 continues to deliver material and means 52 continues to generate digital pulses, down counter continues counting down until the instanteous count therein reaches zero. At this point, and end of batch signal is generated at output terminal 98 of down counter 54.

As will be shown in greater detail below, motor speed controller 40 disables drive means 16 of material feeder 10 whenever an end of batch signal is generated by down counter 54. Accordingly, it is possible to adjust the batch size of material delivered by feeder 10 by merely adjusting the preset count fed into the data input terminal 92 of down counter 54 by way of example, and not limitation, if the desired batch size is 100 pounds and divide by N scaler 76 has been adjusted to generate a single digital pulse for each pound of material delivered by feeder 10, second presettable signal generator 56 is adjusted to generate a digital signal representative of a count of 100. Drive means 16 is enabled and means 52 begins generating a single pulse for each pound of material delivered by feeder 10. After 100 pounds of material has been delivered, the instanteous count in down counter 54 is zero and an end of batch signal is generated at output terminal 98 disabling drive means 16 and terminating the delivery of material by feeder 10.

As noted above, down counter 54 generates a difference signal on line 96 which is representative of the difference between the preset count determined by first presettable signal generator 56 and the number of pulses generated by means 52. Since the number of pulses generated by means 52 as well as the preset count determined by first presettable signal generator 56 is representative of weights of material, the difference signal on line 96 is representative of the cumulative weight of material delivered by feeder 10 during any single batch. Particularly, the magnitude of the difference signal is inversely proportional to the weight of material delivered by feeder 10.

Figure 6:
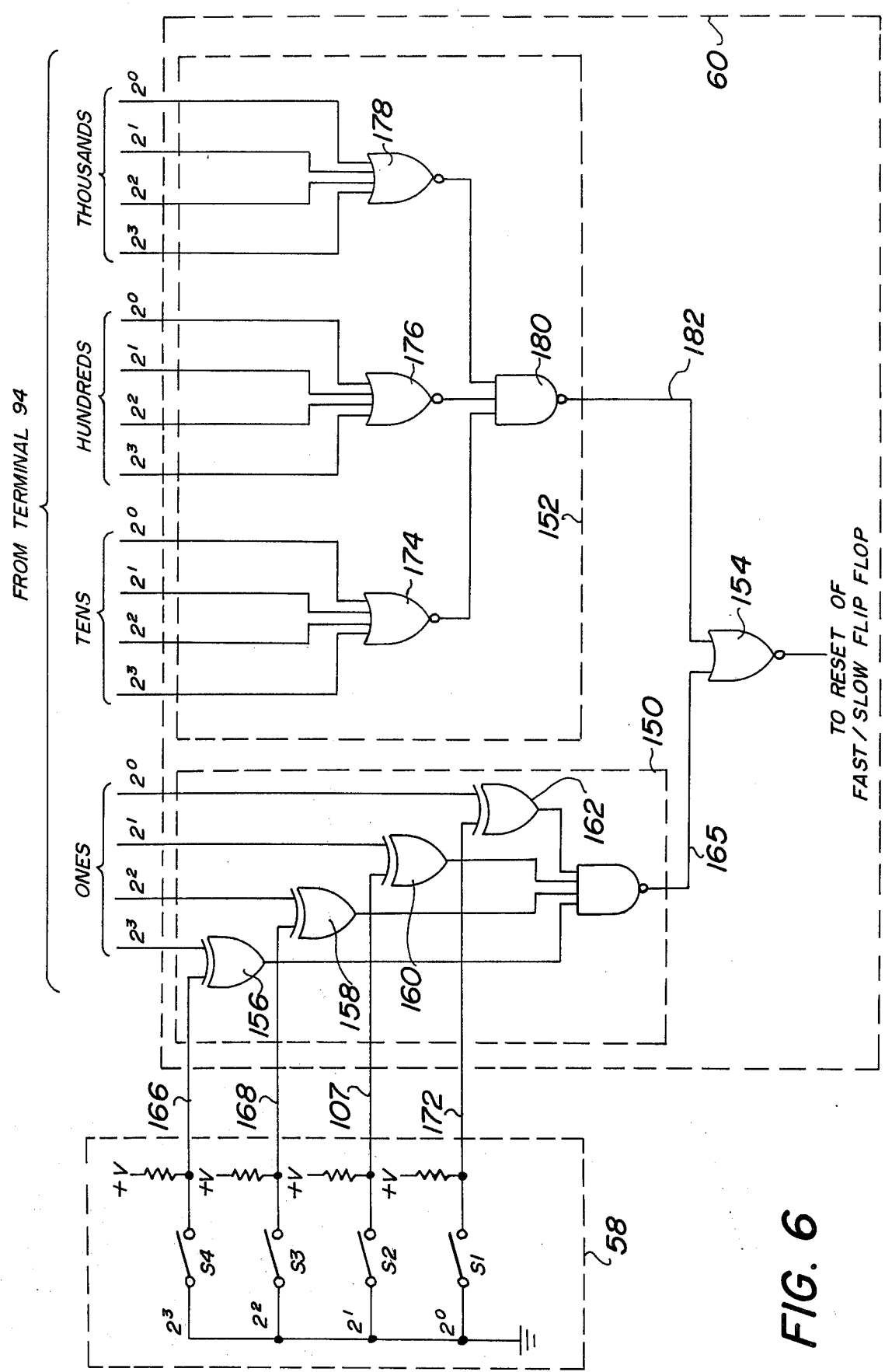
FIG. 6 is a schematic diagram of the logic circuit illustrated in FIG. 3.

The difference signal on line 96 is applied to input terminal 100 of logic circuit 60. The structure of logic circuit 60 is shown in FIG. 6 and described in detail below. It is sufficient at this time to state that logic circuit 60 compares the difference signal on line 96 to a preset signal generated by first presettable signal generator 58 and generates a dribble speed signal when the difference signal is equal to the preset signal generated by first presettable signal generator 58. Stated another way, logic circuit 60 generates a dribble speed signal when the quantity of material delivered by feeder 10 reaches a first preset value determined by first presettable signal generator 58.

The dribble speed signal generated by logic circuit 60 is applied to means 48 which and applies a first pulse train generated by means 44 to motor speed controller 40 prior to the generation of the dribble signal and applies a second pulse train generated by means 46 to said motor speed controller 40 subsequent to the generation of the dribble speed signal.

In the preferred embodiment, means 44 and 46 are adjustable frequency pulse generators which generate a train of pulses of a selected frequency whenever an enabling signal is applied to the inputs thereof. While the exact frequency of the pulse train generated by means 44 and 46 are not critical, it is imperative that the pulse repetition frequency of the pulse train generated by means 44 is greater than the pulse repetition frequency of the pulse train generated by means 46. This relationship is necessary in order that the speed of belt 30 slow down near the end of the desired batch so that the spillover of material when belt 30 comes to a stop is kept to a minimum.

Means 48 comprises gating means 102 responsive to the dribble signal generated by logic circuit 60 and means 104 for applying the pulse train gated by means 102 to motor speed controller 40. Gating means 102 comprises fast/slow flip flop 106 and 108. Fast/slow flip flop 106 is a conventional RS flip flop whose reset input is connected to the ouput of logic circuit 60 and whose set input is connected to one shot 110. When one shot 110 applies an enabling signal (a "high") to fast/slow flip flop 106, the Q output thereof will go "high". As used herein, a "high" voltage level corresponds to a binary logic state usually designated as "1" and a "low" voltage level corresponds to a binary logic state usually designated as "0". In general, all voltage levels below a specified logic threshold voltage are considered to be "low", and all voltage levels above that threshold voltage are considered to be "high". Consequently, when a voltage signal crosses the logic threshold voltage, there is a transition between the "low" and the "high" levels; in other words, there is a transition between binary logic states.

The "high" at the Q output of flip flop 106 is applied to the input of means 44 and the input of inverter 108. Means 44 is enabled by the "high" at the input thereof and generates a first pulse train having a first pulse repetition frequency. Inverter 108 is a binary logic device which generates a "high" at its output terminal whenever a "low" is applied to its input. Conversely, inverter 108 generates a "low" at its output whenever a "high" is applied to its input. When control circuit 38 is to initiate operation of feeder 10, start switch 124 is depressed. Start switch 124 is a normally open pushbutton switch which is biased in the open position and will remain open unless an external force is applied thereto. One terminal of start switch 124 is connected to +V volts, the remaining terminal to one shot 110. When start switch 124 is depressed, a momentary "high" is applied to the input of one shot 110 causing positive going spike to appear at output terminals 126 and 128. The positive going spike appearing at output terminal 128 enables present input terminal 90 of counter 54 thereby transferring the present count into counter 54 in the manner described above. The positive going spike appearing at output terminal 126 is applied to the set input of flip flop 106 (as well as the reset input of motor run flip flop 134), thereby driving the Q output of flip flop 106 high. Accordingly, whenever start switch 124 is depressed, gating means 102 will enable means 44 and disable means 46.

The outputs of means 44 and 46 are applied to the inputs of NAND gate 104. NAND gate 104 is a binary logic device which generates a low at its output terminal whenever both its inputs are high and generates a "high" at its output at all other times. As used in the present circuitry, NAND gate 104 performs an OR function applying the output of means 44 or 46 (depending on which is active) to motor speed controller 40. Accordingly, when start switch 124 is depressed and means 44 enabled, the output thereof will be applied to motor speed controller 40.

When the weight of material delivered by feeder 10 reaches the first preset value determined by first presettable signal generator 58, logic circuit 60 generates the dribble speed signal. The reset input of flip flop 106 is enabled and the Q output of flip flop 106 goes low. Means 44 will be disabled, means 44 will be enabled and a second pulse train having a second pulse repetition frequency determined by means 46 will appear at the output of NAND gate 104.

In summary, when start switch 124 is depressed, an enabling signal is applied to the set input of flip flop 106 and a pulse train having a pulse repetition frequency determined by means 44 will appear at the output of NAND gate 104. This pulse train will continue to appear at the output of NAND gate 104 until logic circuit 60 applies the dribble speed signal to the reset input of flip flop 106. Subsequent to the generation of the dribble speed signal, a pulse train having a pulse repetition frequency determined by means 46 will appear at the output of NAND gate 104.

If control circuit 38 is utilized to control a feeder having constant load characteristics such that the relationship between motor speed and armature current is constant, motor speed controller 40 may be a servoamplifier which generates an output current directly proportional to the frequency of a pulse train applied to its input. In such a situation, the feedback signal from encoder 64 would not be required.

Figure 4:
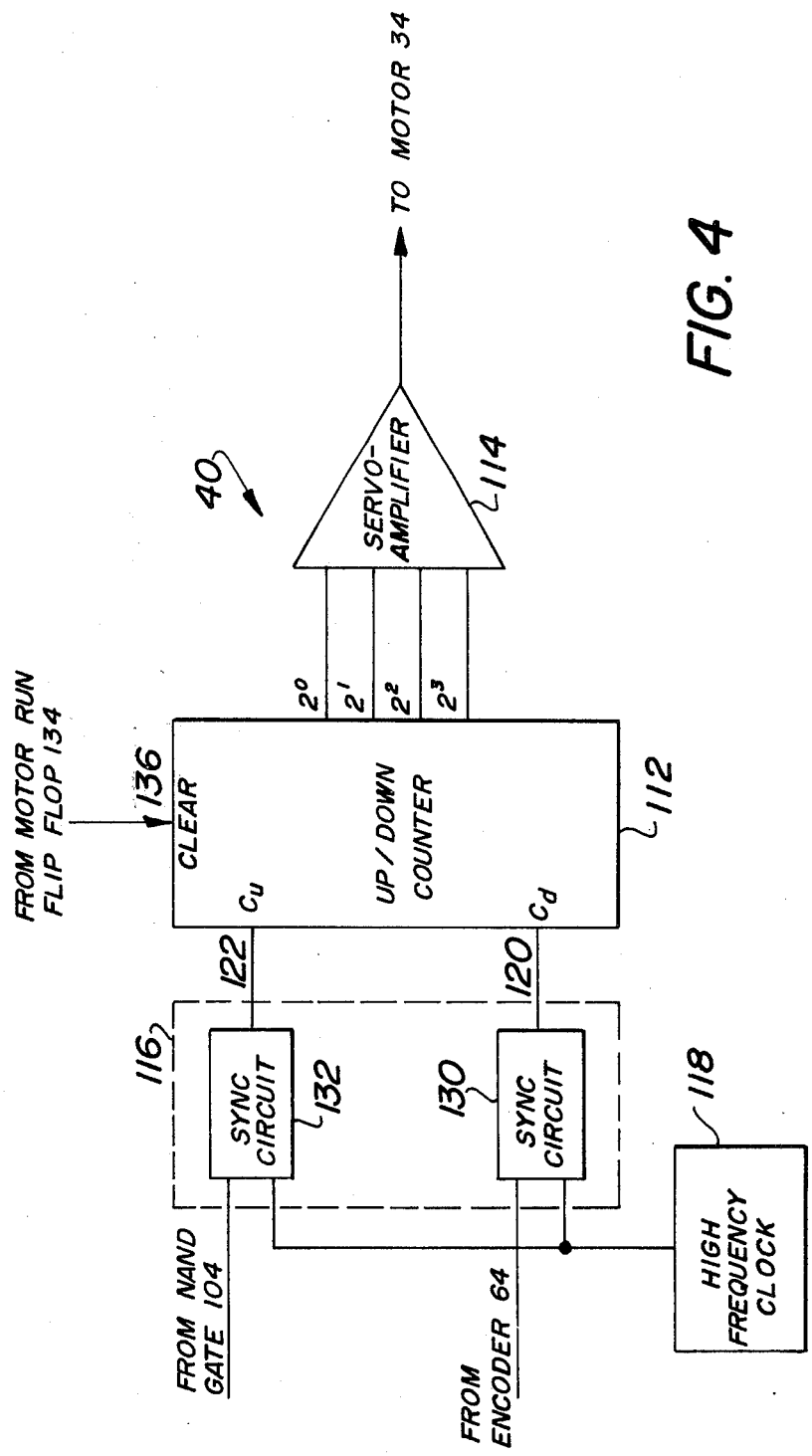
FIG. 4 is a block diagram of the motor speed controller illustrated in FIG. 3.

When utilizing control circuit 38 in conjunction with the feeder having varying load characteristics such as the feeder 10 illustrated in FIGS. 1 and 2, it is preferable to utilize a motor speed controller 40 constructed in the manner shown in FIG. 4. As shown therein, motor speed controller 40 comprises up/down counter 112, servoamplifier 114, sync means 116 and high frequency clock 118. Counter 112 is conventional up/down counter which counts up one count for each pulse applied to its up input terminal 122 and counts down one count for each pulse applied to its down input 120. The instantaneous count in counter 112 is reproduced in digital form at the output thereof and is applied to servoamplifier 114.

Servoamplifier 114 is a current-output servoamplifier and converts the binary output of counter 112 into an analog current signal the level of which determines the armature current furnished to motor 34. Accordingly, the speed of motor 34 is directly proportional to the instanteous count in counter 112.

The pulse train appearing at the output terminal of NAND gate 104 is applied to the up input terminal 122 of counter 112 and the digital output (also in the form of a pulse train) of encoder 64 is applied to the down input terminal 120 in counter 112.

Conventional up/down counters will not operate properly when coincident pulses appear at the up terminal and the down terminal. Because the pulse train appearing at the output of NAND gate 104 is asynchronous with respect to the pulse train generated by encoder 64, it is possibble for individual pulses in these two trains to be coincident in time. To ensure proper operation, a sync means 116 comprising sync circuits 130, 132 is utilized. Sync circuits 130, 132 are conventional circuits which synchronize the pulses appearing at the output of NAND gate 104 and the pulse generated by encoder 64 with alternate half cycles of a clock frequency generated by high frequency clock 118. The frequency of high frequency clock 118 is chosen to be much higher than the frequency of either of the pulse trains applied to counter 112. In this manner, correct counting will be achieved even if pulses of both pulse trains should occur simultaneously.

As noted above, the load characteristics of feeder 10 are non-constant. Particularly, the load on belt 30 will vary depending upon the rate at which hopper 18 dispenses the material stored therein. As a result of the varying load on belt 30, the level of armature current necessary to produce a desired speed of motor 34 (and therefore belt 30) will also vary. The motor speed controller 40 illustrated in FIG. 4, compensates these fluctuations by generating an armature current of sufficient value to produce the desired flow rate under changing loading conditions. This is done by increasing the count in counter 112 in response to an increased load condition and decreasing the count in counter 112 in response to a decreased load condition.

As noted above, the pulse train appearing at the output of NAND gate 104 is applied to up input terminal 122 of counter 112 and the pulse train generated by encoder 64 is applied to the down input terminal 120 of counter 112. Thus, the pulses representative of the desired instantaneous belt speed will cause the counter 112 to count upwardly while the pulses representative of the actual instaneous belt speed will cause counter 112 to count downwardly. When the number of pulses per unit time in each pulse train is the same, the state of counter 112 will be stable. In such case, the actual speed of belt 30 will be the desired speed.

When there is a reduction in the rate at which granular material is deposited from hopper 18 onto belt 30, the mass of material on the belt decreases. Since there is now less material on the belt, the speed of belt 30 will increase unless the armature current is decreased. Motor speed controller 40 effects the necessary decrease in armature current by increasing the frequency of pulses applied to down input terminal 120 of counter 112 and therefore decreasing the value of the digital input to servoamplifier 114. Conversely, if there is an increase in the rate at which granular material is deposited by hopper 18 onto belt 30, the armature current must be increased to keep the belt speed constant. Motor speed controller 40 effects necessary increase in armature current by decreasing the frequency of pulses applied to down input terminal 120 and therefore increasing the digital input to servoamplifier 114.

It can be seen from the foregoing that servoamplifier 114 will generate an output signal of sufficient magnitude to cause belt 30 to rotate at a speed determined by the frequency of the pulse train appearing at the output of NAND gate 104. When control circuit 38 is operating in the upper speed range (prior to the generation of the dribble speed signal by logic circuit 60), means 44 will be enabled and a pulse train of a comparatively high frequency will appear at the output of NAND gate 104. This relatively high frequency pulse train will cause motor speed controller 40 to supply a sufficient armature current to motor 34 to rotate belt 30 at a comparatively high rate. When current 38 senses that feeder 10 is approaching the end of the desired batch size and logic circuit 60 generates the dribble speed signal, means 44 will be disabled and means 46 will be enabled, thereby causing a pulse train having a relatively slow frequency determined by means 46 to appear at the output of NAND gate 104. When this event occurs, the frequency of the pulses applied to input terminal 122 of counter 112 decreases and the input signal to servoamplifier 114 also decreases. As such, the arrmature current decreases and the speed of belt 30 decreases to a rate determined by means 46.

In summary, motor speed controller 40 will supply motor 34 with an armature current of sufficient value to cause belt 30 to deliver material at a rate determined by the frequency of the pulses at the output of NAND gate 104. More particularly, the feed rate will be determined by the pulse repetition frequency of the pulse train generated by means 44 prior to the generation of the dribble speed signal by logic circuit 60 and by the pulse repetition frequency of means 46 subsequent to the generation of the dribble speed signal by logic circuit 60.

When motor speed controller 40 is unable to provide sufficient corrective action to restore the actual speed of belt 30 to the desired value, counter 112 will continuously count either upwardly or downwardly depending upon the corrective action required. Eventually, the counter would either overflow and change from its highest state to its lowest state or would underflow and change from its lowest state to its highest state causing a serious discontinuity in the operation of amplifier 114 and motor 34. To preclude these events, it is preferred that a commercially available synchronous four-bit up/down counter such as a Texas Instruments SN74193 be employed. Such counters have both borrow and carry outputs and may be programmed to prevent the counter from either overflowing or underflowing and dropping to the lowest or highest state, respectively.

Returning now to FIG. 3, the end of batch signal generated at output terminal 98 of down counter 54 is applied to means 50; more particularly, to the set input of motor run flip flop 134. Means 50 comprises motor run flip flop 134 and motor speed controller 40 and causes feeder 10 to stop delivering material upon the generation of the end of batch signal. Motor run flip flop 134 is a conventional RS flip flop. When a high is applied to the reset input of motor run flip flop 134, the Q output goes low. When a high is applied to the set input of motor run flip flop 134, the Q output goes high. When start switch 124 is depressed and control circuit 38 initiates the delivery of a single batch of material, a high is applied to the reset input of motor run flip flop 134 and a low is applied to motor speed controller 40. More particularly, the low at the Q output of flip flop 134 is applied to the clear input 136 of up/down counter 112 (see FIG. 4). The low applied to clear input terminal 136 enables the output of counter 112 to vary in accordance with the input signals applied thereto.

When the weight of material delivered by feeder 10 reaches the preset value determined by second presettable signal generator 56 and the instantaneous count in down counter 54 is reduced to zero, an end of batch signal (a high) is applied to the set input of motor run flip flop 134. The high applied to the set input of motor run flip flop 134 drives the Q output of flip flop 134 high, and the clear input terminal 136 of counter 112 is disabled. In this condition, the output of counter 112 is zero and stays at this level until a positive pulse is again applied to the reset input of motor run flip flop 134. Since the output of counter 112 is zero, the armature current will be zero and belt 30 will be stopped thereby causing feeder 10 to stop delivering material.

In summary, when control circuit 38 is to initiate delivery of a single batch of material, start switch 124 is depressed and a positive going pulses are simultaneously applied to preset input terminal 90 of down counter 54, the set input of fast/slow flip flop 106 and the rest input of motor run flip flop 134. The preset count determined by second presettable signal generator 56 is transferred into down counter 54 and a pulse train having a pulse repetition frequency determined by means 44 is applied to up input terminal 122 of counter 112. The armature current generated by servoamplifier 114 begins increasing and belt 30 begins rotating.

The movement of belt 30 is detected by encoder 64 and a pulse train having a frequency representative of the speed of belt 30 is applied to both the speed input terminal 78 of weight x speed computer 70 and the down input terminal 120 of counter 112. The feedback loop to down input terminal 120 of counter 112 causes motor speed controller 40 to produce an armature current of sufficient magnitude to drive belt 30 at a constant speed determined by means 44. As belt 30 draws the material deposited thereon over load cell 66, a digital weight signal representative of the instantaneous weight of material on belt 30 applied to the weight input terminal 76 of weight x speed computer 70. Weight x speed computer 70 performs a multiplicative operation on the instantaneous weight and speed signals and generates an output signal representative of the actual mass flow rate of material being delivered by feeder 10. This output signal is scaled by divide by N scale 72 which generates a single digital pulse on line 62 for each predetermined weight of material delivered by feeder 10. The output of divide by N scale 72 is applied to down input terminal 88 of down counter 54 and causes the instanteous count in counter 54 to decrease. The decreasing instanteous count in down counter 54 is produced in the form of a difference signal on line 96 and applied to input terminal 100 of logic circuit 60. Logic circuit 60 compares the difference signal to preset signal generated by second presettable signal generator 58 and generates a dribble speed signal when the two input signals are sensed to be equal. It will be recognized that the signal generated by first presettable signal generator 58 will be chosen so that the dribble speed signal will be generated when the quantity of material delivered by feeder 10 is detected to be near the end of the desired batch size determined by second presettable signal generator 56.

When logic circuit 60 generates the dribble speed signal, a high is applied to the reset input terminal of flip flop 106 and the Q output thereof goes low. This disables means 44 and enables means 46 thereby causing a pulse train having a frequency determined by means 46 to be applied to up input terminal 122 of up/down counter 112 (FIG. 4). The pulse repetition frequency of this pulse train is substantially less than that of the pulse train applied to up input terminal 122 prior to the generation of the dribble speed signal causing the output of counter 112 to decrease. The decreased input to servoamplifier 114 causes the armature current, and therefore the speed of belt 30 to decrease proportionally.

Feeder 10 continues to deliver material at this slower feed rate until a sufficient number of pulses have been generated by means 52 to reduce the instantaneous count in down counter 54 to zero. At this point, an end of batch signal is be generated at output terminal 98 and a high is applied to the set input of motor run flip flop 134. This causes a high to be applied to the clear input terminal 136 of counter 112 (FIG. 4) driving both the output of counter 112 and the armature current to zero and stopping the rotation of belt 30.

Figure 5:
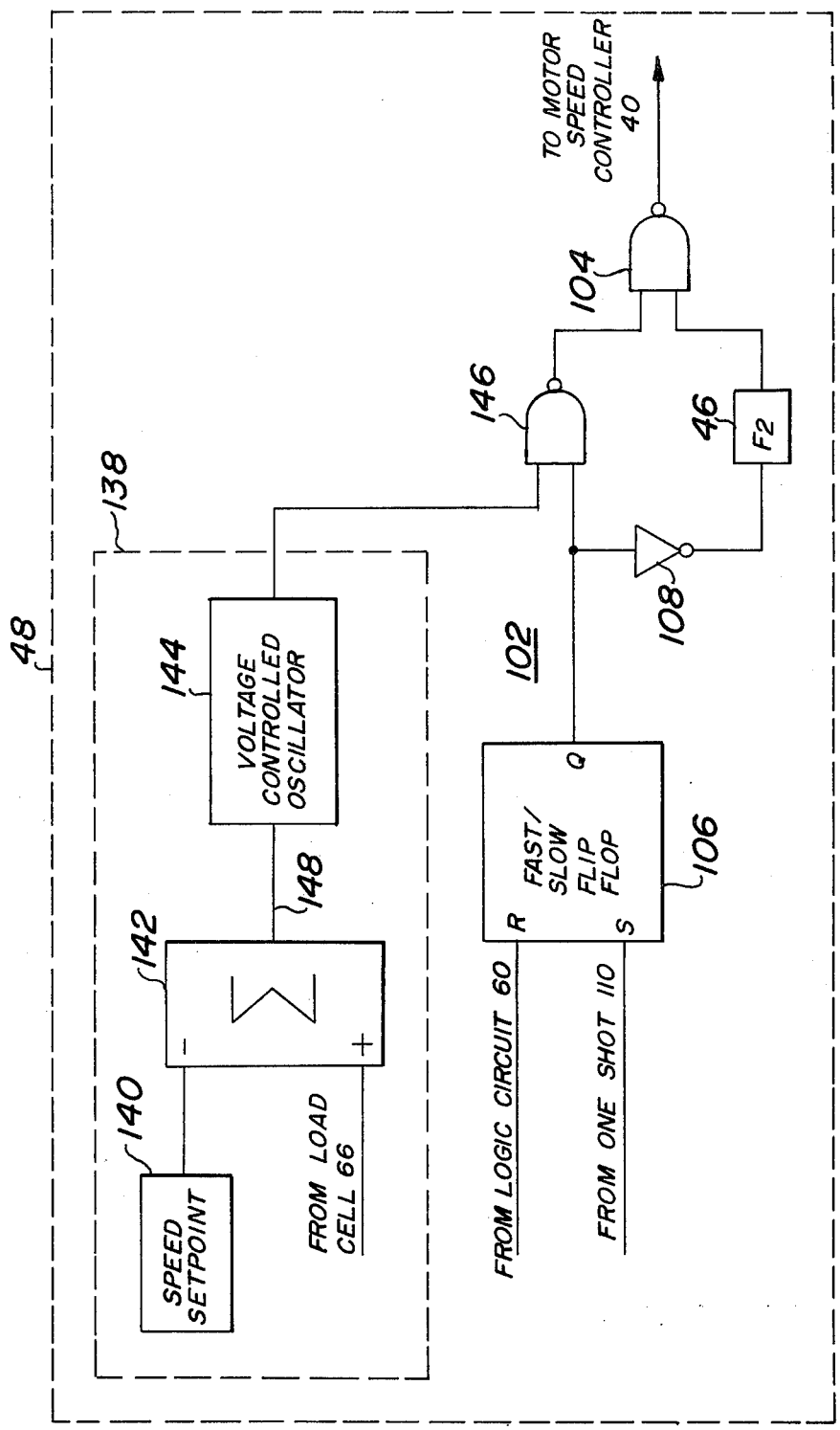
FIG. 5 is a block diagram of a modification of a portion of the circuit shown in FIG. 3.

While the above described control circuit provides constant belt speed and accurate batch measurement, the actual flow rate of material delivered by feeder 10 will vary in accordance with fluctuations of belt loading from hopper 18. Such fluctuations often result in inaccuracies caused by irregular spots of extremely low belt loading where variations in belt tare are significant. A modification of control circuit 38 which will provide a constant belt loading feature is shown in FIG. 5. In this modification of control circuit 38, means 44 for generating a first pulse train having a constant pulse repetition frequency is replaced by means 138 for generating a pulse train having a variable pulse repetition frequency. Means 138 comprises means 140 for generating a speed set point signal, summing means 142 and voltage controlled oscillator 144. Summing means 142 compares an analog speed set point voltage generated by means 140 and the analog output voltage of load cell 66 and generates a output signal on line 148 whose magnitude is representative of the difference between the two input signals. The output signal on line 148 is applied to voltage controlled oscillator 144 which generates a pulse train having a frequency proportional to the level of the signal applied to its input. In the preferred embodiment, summing means 142 is a conventional summing operational amplifier and voltage controlled oscillator 144 is a commercially available VCO such as Signetics NE566.

The modification illustrated in FIG. 5 automatically adjusts the speed of belt 30 in a manner that maintains belt loading at a relatively constant value. For example, if belt loading rises above the desired value due to increased head load in hopper 18, the belt speed increases to reduce the belt loading to the desired value. Particularly, the increased load on belt 30 will result in an increased signal from load cell 66. This results in a increased level of signal at the output of summing means 142 thereby increasing both the frequency of the pulses generated by voltage controlled oscillator 144 and the speed of belt 30. If the belt loading decreases due to starvation in hopper 18, the belt speed also decreases to increase the belt loading to the desired value. Particularly, the decreased belt loading results in a lower level signal from load cell 66 thereby decreasing the level of the signal on line 148. This decreased signal results in an decreased output of voltage controlled oscillator 144 decreasing both the frequency of pulses applied to up input terminal 122 of counter 112 and the speed of belt 30.

In the modified circuit illustrated in FIG. 5, NAND gate 146 has been added to gating means 102. NAND gate 146 serves to gate the variable pulse train at the output of voltage controlled oscillator 144 whenever the Q output of fast/slow flip flop 106 is high. Accordingly, a pulse train having a pulse repetition frequency equal to that of the pulse train appearing at the output of voltage controlled oscillator 144 will appear at the output of NAND gate 104 whenever the Q output of fast/slow flip flop 106 is high. Means 154 generates the dribble speed signal (a high) when means 150 and 152 both generate an enabling signal (a low). This condition occurs when the difference signal generated by counter 54 is equal to the preset signal generated by first presettable signal generator means 58.

The preferred structure of first presettable signal generator 58 and logic circuit 60 are illustrated in FIG. 6. Logic circuit 60 comprises means 150, means 152, and means 154. Means 150 compares the preset signal generated by first presettable signal generator means 58 to the least significant digit of the difference signal generated by counter 54 and generates a first enabling signal on line 165 when the least significant digit of the difference signal is detected to be equal to the preset signal. In the preferred embodiment, the difference signal generated by counter 54 is in BCD form. As shown in FIG. 6, each digit of this signal comprises a four bit digital representation of the value of the appropriate digit. For convenience, the "ones", "tens","hundreds" and "thousands" digits have been labeled accordingly.

Means 150 comprises exclusive OR gates 156, 158, 160, 162 and NAND gate 164. Exclusive OR gates 156 through 162 are binary logic devices which generate a high at its output when its inputs are high and low and generates a low at its output for all other combinations. One input of each exclusive OR gate 156, 158, 160 and 162 is connected to a different output of first presettable signal generator 58. The remaining input of each exclusive OR gate 156, 158, 160 and 162 is connected to a different bit of the four bit output representing the least significant digit or "ones" column of the BCD difference signal generated by down counter 54. If it is desirable to reduce the feed rate of feeder 10 to the dribble speed rate when the actual weight of material delivered is within five units of the desired batch size, switches S1 and S3 of second presettable signal generator 48 are closed and switches S2 and S4 are opened. This generates a binary coded output of 1010 on output terminals 166, 168, 170, 172, respectively. When the value of the least significant digit of the BCD coded signal generated by counter 54 is 0101 (inputs to 156, 158, 160, 162, respective), the output of NAND gates 156 through 162 will all go high and the output of NAND gate 164 will go low. In summary, means 150 will compare a preset signal generated by first presettable signal generator 58 to the least significant digit of the difference signal generated by counter 54 and will generate an enabling signal (a low) at the output of NAND gate 164 when the two input signals are detected to be equal.

Means 152 comprises NOR gates 174, 176, 178 and NAND gate 180 and generates a second enabling signal on line 182 when all but the least significant digit of the difference signal generated by counter 54 are zero. Each NOR gates 174 through 178 is a binary logic devices which generate a high at its output whenever a low is applied to each of its inputs, and generates a low at its output for all other conditions. The inputs of NOR gates 174, 176 and 178 are connected to output terminal 94 of counter 54. Particularly, the inputs of NOR gate 174 are connected to the four bit output representing the "tens" digit of the BCD signal generated by counter 54, the inputs of NOR gate 176 are connected to the four bit binary output representing the "hundreds" digit of the BCD signal generated by counter 54, and the inputs of NOR gate 178 are connected to the four bit digital output representing the "thousands" digit of the BCD signal generated by counter 54. When the "tens", "hundreds" and "thousands" digits of the difference signal generated by counter 54 are all zero, the outputs of NOR gates 174, 176 and 178 will be high and the output of NAND gate 180 will be low. In summary, means 152 will generate an enabling signal (a low) when all but the least significant digit of the difference signal generated by counter 54 is zero.

The outputs of means 150 and 152 are applied to the inputs of means 154 which is a conventional NOR gate which operates in the manner described above. Means 154 generates the dribble speed signal, a high) when means 150 and 152 both generate an enabling signal (a low). This condition occurs when the difference signal generated by counter 54 is equal to the preset signal generated by first presettable signal generator means 58.

The present invention may be embodied in other specific forms without departing from the spirit or essential attributes thereof and, accordingly, reference should be made to the appended claims, rather than to the foregoing specification as indicating the scope of the invention.

What is claimed is:

1. Digital control apparatus for controlling the operation of a material feeder, comprising:
    signal generating means for computing the weight of material delivered by said feeder and for generating a dribble speed signal when said weight of material reaches a first preset value and an end of batch signal when said weight of material reaches a second preset value;
    means for generating a first pulse train having a first pulse repetition frequency;
    means for generating a second pulse train having a second pulse repetition frequency, said second pulse repetition frequency being less than said first pulse repetition frequency;
    motor speed controller means for controlling the feed rate of said feeder;
    means responsive to said dribble speed signal for applying said first pulse train to said motor speed controller means prior to the generation of said dribble speed signal and for applying said second pulse train to said motor speed controller means subsequent to the generation of said dribble speed signal;
    said motor speed controller means to cause said feeder to deliver material as a feed rate proportional to the frequency of the pulse train applied thereto; and
    means responsive to the generation of said end of batch signal for causing said feeder to stop delivering material.

2. Apparatus in accordance with claim 1 wherein said signal generating means comprises:
    pulse generator means for detecting the weight of material delivered by said feeder and for generating a single digital pulse for each predetermined quantity of material delivered by said feeder means;
    counter means for comparing the number of pulses generated by said pulse generator means to a preset count representative of said second preset value and for generating a difference signal representative of the difference between the number of pulses generated by said pulse generating means and said preset count, said counter means also for generating said end of batch signal when the number of pulses generated by said pulse generator means equals said preset count; and
    logic circuit means for comparing said difference signal to a preset signal representative of said first preset value and for generating said dribble speed signal when said difference signal reaches a value determined by said preset signal.

3. Apparatus in accordance with claim 2 including means for adjusting said preset count.

4. Apparatus in accordance with claim 2 including means for adjusting said preset signal.

5. Apparatus in accordance with claim 2 wherein said counter means counts down one count from said preset count for each digital pulse generated by said pulse generator means and wherein said difference signal is representative of the instantaneous count in said counter means.

6. Apparatus in accordance with claim 5 wherein said difference is a BCD digital signal and wherein said logic means comprises:
    means for comparing said preset signal to the least significant digit of said difference signal and for generating a first enabling signal when said least significant digit is equal to said preset signal;
    means for generating a second enabling signal when all but the least significant digit of said difference signal is zero; and
    means responsive to said first and second enabling signals for generating said dribble speed signal when said difference signal is equal to said preset signal.

7. Apparatus in accordance with claim 1 wherein said means for generating a first pulse train is an adjustable frequency pulse generator.

8. Apparatus in accordance with claim 1 wherein said means for generating a second pulse train is an adjustable frequency pulse generator.

9. Apparatus in accordance with claim 1 wherein said means responsive to said dribble speed signal comprises:
gating means for selectively gating either said first or second pulse train; and
means for applying said gated pulse train to said motor speed controller.

10. Apparatus in accordance with claim 1 wherein said means for generating a first pulse train and said means for generating a second pulse train are adjustable frequency pulse generators which generate a train of pulses of a selected frequency whenever an enabling signal is applied thereto and wherein said means responsive to said dribble speed signal comprises:
means responsive to said dribble speed signal for applying an enabling signal to said means for generating a first pulse train prior to the generation of said dribble speed signal and for applying an enabling signal to said means for generating a second pulse train subsequent to the generation of said dribble speed signal; and
NAND gate means for applying the outputs of said means for generating a first pulse train and said means for generating a second pulse train to said motor speed controller means.

11. Apparatus in accordance with claim 1 wherein said first pulse repetition frequency is a variable frequency.

12. Apparatus in accordance with claim 11 wherein said feeder is an endless belt feeder and wherein said means for generating a first pulse train having a first pulse repetition frequency comprises:
means for generating a belt loading signal representative of the instanteous load on said endless belt; and
means responsive to said belt loading signal for generating a pulse train having a frequency representative of the instanteous difference between said belt loading signal and a preset speed set point signal.

13. Apparatus in accordance with claim 12 wherein said means responsive to said belt loading signal comprises:
summing means for generating an output signal representative of the difference between said belt loading signal and said speed set point signal; and
means responsive to said output signal for generating a pulse train having a pulse repetition frequency proportional to the value of said output signal.

* * * * *